(12) United States Patent
Navio Gilaberte et al.

(10) Patent No.: US 8,978,640 B2
(45) Date of Patent: Mar. 17, 2015

(54) SUPERHEATED STEAM SOLAR RECEIVER

(75) Inventors: Raúl Navio Gilaberte, Seville (ES);
Noelia Martinez Sanz, Seville (ES);
José Barragan Jiménez, Seville (ES);
Lucía Serrano Gallar, Seville (ES);
Paula Llorente Folch, Seville (ES); José María Méndez Marcos, Seville (ES)

(73) Assignee: Abengoa Solar New Technologies, S.A., Sevilla (ES)

( * ) Notice: Subject to any disclaimer, the term of this patent is extended or adjusted under 35 U.S.C. 154(b) by 678 days.

(21) Appl. No.: 13/375,740

(22) PCT Filed: Jun. 2, 2010

(86) PCT No.: PCT/ES2010/000247
§ 371 (c)(1),
(2), (4) Date: Feb. 7, 2012

(87) PCT Pub. No.: WO2010/139823
PCT Pub. Date: Dec. 9, 2010

(65) Prior Publication Data
US 2012/0125319 A1    May 24, 2012

(30) Foreign Application Priority Data
Jun. 5, 2009    (ES) .................................. 200901374

(51) Int. Cl.
*F24J 2/07*    (2006.01)
*F22B 1/00*    (2006.01)
*F24J 2/04*    (2006.01)
*F24J 2/24*    (2006.01)

(52) U.S. Cl.
CPC . *F24J 2/07* (2013.01); *F22B 1/006* (2013.01); *F24J 2/0494* (2013.01); *F24J 2/24* (2013.01); Y02E 10/41 (2013.01); Y02E 10/44 (2013.01); Y02E 10/46 (2013.01)
USPC ............ 126/617; 126/645; 126/634; 126/663

(58) Field of Classification Search
CPC ................. F24J 2/07; F24J 2/14; F24J 2/245; F24J 2/04; F24J 2/242; F24J 2002/4603
USPC .................................. 126/617, 645, 634, 663
See application file for complete search history.

(56) References Cited

U.S. PATENT DOCUMENTS

| | | |
|---|---|---|
| 4,296,730 A | 10/1981 | Zadiraka |
| 4,485,803 A | 12/1984 | Wiener |
| 4,512,336 A | 4/1985 | Wiener |
| 6,926,440 B2 | 8/2005 | Litwin |
| 7,296,410 B2 | 11/2007 | Litwin |

*Primary Examiner* — Alfred Basichas
(74) *Attorney, Agent, or Firm* — Hamre, Schumann, Mueller & Larson, P.C.

(57) ABSTRACT

Superheated steam tower receiver with a well-defined configuration that benefits the transfer of heat between the surface of the component and the working fluid. Composed of at least four subpanels that define the circulation circuit for the steam by means of internal passages. The component is provided with saturated steam and for the production of said steam it is possible to use other solar concentrator technology. The proposed configuration minimizes the technological risks inherent in superheated steam receiver technology where drawbacks arise in the structure of the material owing to the thermal cycles to which the solar component is subjected.

6 Claims, 2 Drawing Sheets

SUPERHEATED STEAM SOLAR RECEIVER

TECHNICAL FIELD

Figure 1:
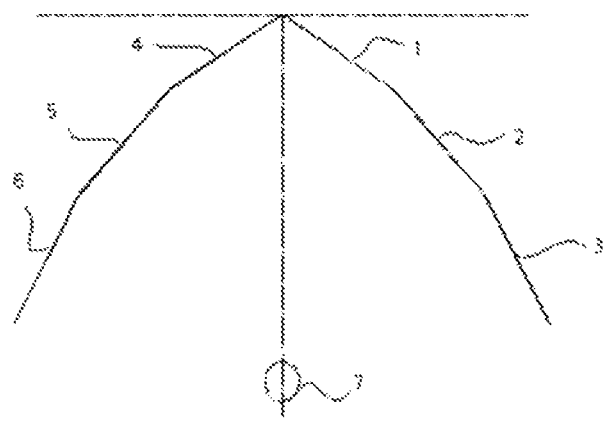

This invention belongs to the field of concentrated-solar technologies for producing superheated steam, more specifically to central receiver tower technology with a field of heliostats used to generate electricity.

INVENTION BACKGROUND

Included in concentrated-solar technologies, are central tower receiver systems where direct solar radiation is reflected by a fields of heliostats pointed towards a receiver. The receiver is the component where all the solar radiation is concentrated and through which the energy is transferred to a working fluid that can reach temperatures beyond 1000° C.; this energy is then used to generate electricity.

There are currently various types of receivers available with different working fluids and different ways in which energy is transferred to the latter and varying receiver configurations too. Also, there are receiver tubes, volumetric receivers, receivers that exchange energy directly or indirectly, saturated steam and superheated steam receivers, among others.

The concentrated solar tower receivers can be external or they may have a cavity located in the upper part of the tower with the aim of reducing heat loss. The configuration must enable the incidental power to exceed the magnitude of the loss through radiation and convection. With superheated steam receivers, the temperature reached on the surface is greater than with the water/steam ones, which is why the losses through radiation are also greater, however, they have the advantage of increasing the efficiency of the thermodynamic cycle, and therefore the losses are offset.

So the main advantage of superheated steam receivers is that by working with a more energetic fluid, they increase the turbine efficiency and that of the thermodynamic cycle, thereby reducing the costs of producing electricity. It is estimated that the efficiency of the cycle can increase by 10% and the electric energy production could reach 20%.

The idea of using superheated steam receivers in concentrated solar tower receivers was implemented in Cesa-1 and Solar One projects in the 80s. The Cesa-1 project, situated in the Almeria Solar Platform, had a receiver cavity composed of an evaporator and two super heater beams on top of the evaporator. The Solar One receiver had an open cylindrical structure that was easier to build than the Cesa-1 receiver, but with greater heat loss.

There were technical inconveniences in operating the plants for both projects related mainly to the resistance of the materials and controlling the systems under transitory conditions. Cracks appeared in the upper part of the receiver's subpanels in Solar One, caused by the difference in temperature between one panel and another, which caused the working fluids to leak; the proposed solution was to decrease the temperature gradient between the panels with some structural changes. In Cesa-1, the problems experienced were caused by the thermal inertia of the system that caused flooding in the super-heater collectors.

In view of the foregoing, the superheated steam receivers can suffer damage to their structure due to the high operating temperatures, the distribution of incidental fluids (not uniform) and the thermal pressure to which the material is subjected. The thermal cycles are generated by surface environmental exposure, radiation reflected by the heliostats (reaching temperatures of nearly 600° C.) and the temperature gradient of the working fluid between the entry and the exit of the component (the steam enters at around 250-310° C. and exits at 540° C.).

The aforementioned inconveniences with the superheated steam receivers can be reduced by eliminating the coexistence of the liquid-steam phases inside the tubes and with the suitable configuration of the elements that make up the solar component. This is where the importance of the design and configuration of the receiver takes effect, enabling the correct operation and control of the system and guaranteeing the integrity and durability of the structure.

INVENTION DESCRIPTION

This invention proposes the design of a central-tower superheated steam receiver, with a defined configuration that enables the components to function correctly and the proper operation of these in solar plants.

The main advantage of the design of this invention is that by using it, the service life of the receiver is increased as the working fluid has to flow through a well-defined circuit through the subpanels that make up the receiver, therefore reducing the temperature difference between the adjacent panels and the thermal pressure experienced by the material that causes damage to the structure such as fractures or cracking.

This cavity-receiver is supplied by a saturated steam current that superheats as it follows its course, through the solar radiation reflected by the heliostats and concentrated in the receiver. The saturated steam can be supplied by any other source, including those that use concentrated-solar technologies to produce it; therefore the proposed design can be used together with other types of solar plants. Also, this receiver enables the use of a water-steam energy storage system or a salt storage system.

The proposed receiver configuration is made up of a series of subpanels where solar radiation is concentrated. The subpanels are adjacent to one another with a geometric semi-cylindrical layout, in a way that, thanks to this configuration, it allows all the solar energy from the heliostats to be obtained.

Each subpanel is made up of vertical beam tubes with the working fluid circulating inside them as it is fed by the upper part of the central subpanels.

Also, each subpanel is made up of at least two passages, this is the area of the subpanel that is made up of a group of tubes where the steam circulates in the same direction (from top to bottom or the other way around); as the current exits last passage of each subpanel, it supplies the adjacent subpanel.

The advantages of using passages in each subpanel are that it benefits the transfer of heat between the surface of the receiver and the fluid and it also increases the flow of fluid that circulates through the receiver.

This configuration means that the gradients on the surface of the receiver are marginal as a result of the refrigeration that is obtained in areas of maximum flow of incidental radiated power, beginning the steam passage at a lower temperature through the central parts of the receiver. Therefore the steam's course is defined in relation to the distribution of the incidental radiating flow.

The receiver described above enables greater efficiency of the thermodynamic cycle, more so than that obtained with saturated steam receivers, because by using superheated steam as a working fluid, the turbine efficiency is increased. The proposed configuration minimizes the technological risks that are present in other receivers for the same use, in which the thermal cycles that the material has to endure are stronger and therefore have a greater impact on the material.

This device therefore resolves the inconveniences encountered with the technology of superheated steam receivers and provides benefits from its use such as reducing the risk of damage to the receiver structure and material, increasing the efficiency of the thermodynamic cycle, aiding the control of the system and reducing maintenance and electricity generation costs.

DIAGRAM DESCRIPTIONS

To complete this description and with the aim of providing a better understanding of the invention's characteristics, said description is accompanied by a series of diagrams that form an integral part of the same, by way of illustration and without limitation, which are as follows:

FIG. 1. Geometry of a superheated steam receiver with 6 subpanels

Figure 2:
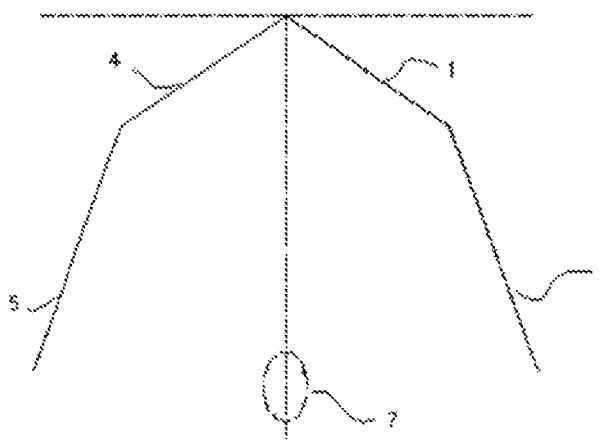

FIG. 2. Geometry of a superheated steam receiver with 4 subpanels

Figure 3:
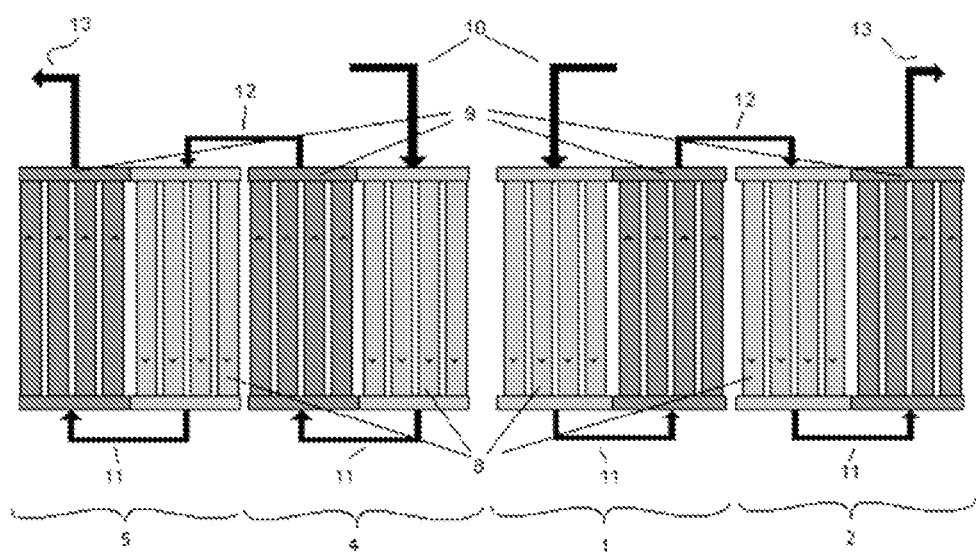

FIG. 3. Possible configuration of the subpanels of the proposed central tower receiver for the production of superheated steam. Steam course.

Below is a list of the references used in the figures:
(1) Subpanel 1 east
(2) Subpanel 2 east
(3) Subpanel 3 east
(4) Subpanel 1 west
(5) Subpanel 2 west
(6) Subpanel 3 west
(7) Heliostat focus point
(8) Subpanel passage 1
(9) Subpanel passage 2
(10) Saturated steam supply to the receiver, carried out through the central subpanels
(11) Incoming steam current from passage 1 to passage 2
(12) Steam current that supplies passage 1 of the adjoining subpanel
(13) Superheated steam current that exits the receiver

PREFERENTIAL EXECUTION OF THE INVENTION

To obtain a better understanding of the invention, below is a description of the system and the operating procedure of the central-tower superheated steam receiver.

As can be seen in FIGS. 1 and 2, the superheated steam receiver is made up of a series of subpanels, six in FIG. 1 (1, 2, 3, 4, 5, 6) and four in FIG. 2 (1, 2, 4, 5) where the solar radiation is concentrated. The subpanels (1, 2, 3, 4, 5, 6) are adjacent to one another with a geometric semi-cylindrical layout, so that, as a result of this configuration, all the solar energy is obtained from the field of heliostats that reflect the solar radiation and point it toward the focus point (7).

The configuration of a receiver with four subpanels as shown in FIG. 2 can be seen in FIG. 3, which also shows the working fluid circuit through four subpanels (1, 2, 4, 5) of the superheated steam receiver.

Each subpanel (1, 2, 4, 5) is made up of vertical beam tubes gathered in at least two passages or zones, in passage 1 (8) and passage 2 (9).

The working fluid circulates through a well-defined circuit through the subpanels (1, 2, 4, 5) that make up the receiver. The saturated steam supply can come from another source and it is introduced into the receiver through a supply route (10) situated on the upper part of the central subpanels (1, 4). This saturated steam is superheated as it follows its course by solar radiation reflected by the heliostats and concentrated in the receiver. The steam travels through passage 1 (8) of the first subpanel and it circulates (11) towards passage 2 (9). Once it exits the first subpanel it is introduced (12) into the adjacent subpanel and follows passages 1 (8) and 2 (9) of the second subpanel in the same way. Once it has completed its journey through the subpanels that make up the receiver, it exits as superheated steam (13).

This receiver allows the possibility of implementing a water-steam energy storage system or a salt storage system.

The invention claimed is:

1. A superheated steam tower, comprising
  a heliostats;
  a receiver including a first subpanel and a second subpanel positioned adjacent to one another and connected in series;
    wherein an upper part of the receiver is configured to receive a steam and the steam received is directed to the first subpanel and then to the second subpanel,
    the first and second subpanels are arranged in a geometric semi-cylindrical layout facing a focus point of the heliostats,
    the first and second subpanels each has a first passage and a second passage, and is configured so that the first passage receives the steam, and the steam is directed from the first passage to the second passage, and
    a direction of the steam in the first passage is opposite relative to a direction of the steam in the second passage, and
    the steam is superheated in the receiver.

2. The superheated steam tower of claim 1, wherein the steam received by the receiver is produced by a concentrated solar technology.

3. The superheated steam tower of claim 1, further comprising:
  a water-steam energy storage system or salt storage system.

4. The superheated steam tower of claim 1, wherein at least one of the first passage and the second passage of the first subpanel or the second subpanel includes a plurality of vertical tubes, and the plurality of vertical tubes are configured to have the same direction of the steam.

5. A solar receiver for a steam tower, comprising
  a first subpanel and a second subpanel positioned adjacent to one another and connected in series;
    wherein an upper part of the solar receiver is configured to receive a steam and the steam received is directed to the first subpanel and then to the second subpanel,
    the first and second subpanels each has a first passage and a second passage, and is configured so that the first passage receives the steam, and the steam is directed from the first passage to the second passage, and
    a direction of the steam in the first passage is opposite relative to a direction of the steam in the second passage.

6. The solar receiver of claim 5, wherein at least one of the first passage and the second passage of the first subpanel or the second subpanel includes a plurality of vertical tubes, and the plurality of vertical tubes are configured to have the same direction of the steam.

* * * * *